United States Patent [19]
Rao

[11] Patent Number: 6,141,415
[45] Date of Patent: *Oct. 31, 2000

[54] METHOD AND APPARATUS FOR DETECTING SPEECH AT A NEAR-END OF A COMMUNICATIONS SYSTEM, A SPEAKERPHONE SYSTEM, OR THE LIKE

[75] Inventor: Tandhoni S. Rao, McKinney, Tex.

[73] Assignee: Texas Instruments Incorporated, Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/729,468

[22] Filed: Oct. 11, 1996

[51] Int. Cl.⁷ ........................................ H04M 9/08
[52] U.S. Cl. .................. 379/410; 379/390; 379/406; 379/420; 381/66; 381/71.1
[58] Field of Search ................... 379/410, 411, 379/388, 389, 390, 406, 407, 402, 408, 409, 345, 420; 381/71.1, 95, 96, 66; 370/268, 286; 455/569, 570

[56] References Cited

U.S. PATENT DOCUMENTS

| | | | |
|---|---|---|---|
| 4,241,235 | 12/1980 | McCanney | 381/61 |
| 4,670,903 | 6/1987 | Araseki et al. | 379/410 |
| 5,185,803 | 2/1993 | Moyski et al. | 379/390 |
| 5,305,307 | 4/1994 | Chu | 379/406 |
| 5,323,458 | 6/1994 | Park et al. | 379/410 |
| 5,390,244 | 2/1995 | Hinman et al. | 379/410 |
| 5,526,426 | 6/1996 | McLaughlin | 379/411 |
| 5,533,120 | 7/1996 | Staudacher | 379/390 |
| 5,598,468 | 1/1997 | Ammicht et al. | 379/410 |
| 5,633,936 | 5/1997 | Oh | 379/406 |
| 5,646,990 | 7/1997 | Li | 379/389 |
| 5,657,384 | 8/1997 | Staudacher et al. | 379/390 |
| 5,680,450 | 10/1997 | Dent et al. | 379/410 |
| 5,717,772 | 2/1998 | Lane et al. | 381/93 |

*Primary Examiner*—Forester W. Isen
*Assistant Examiner*—Jacques M. Saint-Surin
*Attorney, Agent, or Firm*—Lawrence J. Bassuk; Frederick J. Telecky

[57] ABSTRACT

A method and communication system (10), which can be used in a full, pseudo full, or half duplex speaker-phone system, includes a circuit (14) to remove a frequency component from a received signal to output a modified received signal, and a speaker (18) to convert the modified received signal to an acoustic signal (20). The circuit (14) may be, for example, a notch filter, which may remove a sharp frequency range between about 1250 Hz and 1550 Hz. A microphone (26) converts a second acoustic signal (24) to an electrical signal for transmitting, and a detector (30) produces a detector output if the removed frequency is present in the acoustic signal (24). A circuit (34) is also provided to modify a circuit parameter applied to the received signal when the detector (30) produces a detector output. The parameter may be, for instance an attenuation applied to the received signal.

38 Claims, 3 Drawing Sheets

METHOD AND APPARATUS FOR DETECTING SPEECH AT A NEAR-END OF A COMMUNICATIONS SYSTEM, A SPEAKER-PHONE SYSTEM, OR THE LIKE

BACKGROUND OF THE INVENTION

1. Field of the Invention

This invention relates to improvements in communication systems, and more particularly to improvements in speaker-phone systems, and still more particularly to improvements in methods and apparatuses for detecting the presence of speech in a speaker-phone system, or the like.

2. Relevant Background

Speaker-phone systems in widespread use are systems by which individuals communicate over telephone, intercom, radio, or other transmission media, essentially "hands free." In a typical speaker-phone system, both communication ends have a transmitter to translate a voice or other sound to be transmitted into electrical signals for transmission, normally using a microphone, and a receiver to translate the received signals into sound for listening, normally using a speaker. As a matter of convention, a remote end of the system is referred to herein as the "far-end," and a close end is referred to as the "near-end."

Although most speaker-phone systems use a half duplex mode of operation, in which only one speaker can talk at any time, some speaker-phone systems use either a full duplex or a "pseudo-full" duplex mode of operation, in which both communication ends transmit and receive simultaneously. However, in full and pseudo full duplex systems if the speaker and microphone are positioned too closely together or to common reflecting surfaces, such as walls, or the like, or if the speaker volume is set too high, a portion of the received signal is fed back into the transmitting path, often causing unwanted echos of varying magnitude. In some cases, the systems may oscillate or squeal, particularly if similar conditions exist at both the near and far ends of the system.

This problem has been addressed in various ways. For example, most speaker-phone systems use an echo cancellation circuit at each end of the system. A typical echo cancellation unit, for instance at the near-end of the system, processes a signal that has been received from the far-end in a far-end speech module, which computes the power of the received far-end signal before passing the received signal to the speaker or audio circuitry. Usually, the far-end speech module calculates the power over both short and long-term time windows. The echo canceler unit also receives the signal that is being transmitted from the near end, and processes it in a near-end speech module, which computes the power of the near-end signal before passing it to the transmitter circuitry. Usually, the near-end speech module also calculates the power over both short and long-term time windows.

The power computations of the far and near end speech modules are then processed in a control logic module, which, depending upon the relative power ratios that are calculated, modifies the characteristics of line and acoustic echo cancellation circuits. For example, if the ratio of the short term power to long term power exceeds a predetermined threshold, the control logic module determines that far-end speech exists. If far-end speech is determined to be present, a further comparison is made between the relative short term powers that are computed to determine if near-end speech also is present.

Proper analysis of the far-end and near-end speech signals enables the control logic to accurately discriminate between four possible modes of speaker-phone operation: idle, far-end speech only, near-end speech only, and double talk, in which both near-end and far-end speech occur simultaneously. The control logic module then uses operating mode information to control the echo canceler circuit adaptation process and to switch losses into the loop, for example by modifying the operation of the near-end and far end speech units to maintain an overall loop gain at less then 0 dB. Additionally, the determinations generally are used to adjust the thresholds of the received and transmitted signals, so that a particular volume of near-end audio is required to initiate a particular transmission and attenuate the received signal.

Echo cancellation circuits generally operate in one of three modes. When near-end speech that exceeds a predetermined threshold is detected, one mode is to merely continue the same transmitter and receiver parameter values as existed just before the time at which the near-end speech was detected. Another mode of operation is to selectively switch the received signals off and on, so that, for instance, when near-end speech is detected, the transmitter is switched on and the receiver is switched off. This is probably the most widely used technique. The third mode, which is used in more sophisticated full duplex systems, is to modify or apportion attenuation between the received and transmitted signals to control the overall loop gain to a constant value, less than 0 dB, thereby avoiding the undesired oscillations or squeals described above.

Thus, in operation, when a near-end and far-end connection is established, an automatic initialization and calibration of the near-end and far-end units is generally performed. In the initialization and calibration procedure, the loop attenuation is calibrated and the operating parameters of the echo cancellation circuits are determined and adjusted, depending upon the particular environmental and background noise conditions existing at the time of calibration. However, even when such circuits, processing techniques, and echo cancellation procedures are used, the problems described above are not totally eliminated. For example, if one user suddenly changes the volume of his speaker, or if a noise source, such as a fan, suddenly starts, most speaker-phone systems still have a tendency to squeal, at least until a new automatic initialization and calibration procedure can be re-performed.

It can be seen that this approach and its variants may lead to incorrect decisions regarding the particular operating mode in which the speaker-phone system should be operating. The thresholds described above are commonly determined empirically, and are not robust to changes in environmental conditions, often resulting in a poorly performing speaker-phone system.

What is needed is a method and apparatus to accurately detect the presence of near-end speech to assure quality of transmission and to control feedback of the received far-end signal.

SUMMARY OF THE INVENTION

In light of the above, therefore, it is an object of the invention to provide an improved communication system.

It is another object of the invention to provide an improved communication system of the type described that can be employed in an improved speaker-phone system, or the like.

It is another object of the invention to provide a method and apparatus to accurately detect the presence of near-end speech to assure quality of transmission and to control feedback of the received far-end signal in a speaker-phone system, or the like.

It is still another object of the invention to provide a method and apparatus in which speaker-phone thresholds can be robustly changed in response to changes in environmental acoustic conditions in which the system is used.

It is yet another object of the invention to provide an improved method and apparatus of the type described that can be used in conjunction with existing speaker-phone systems to improve the performance thereof.

It is yet another object of the invention to provide an improved method and apparatus of the type described that can be used in conjunction with existing half, full, or pseudo full duplex speaker-phone systems, or the like.

These and other objects, features, and advantages will become apparent to those skilled in the art from the following detailed description, when read in conjunction with the accompanying drawings and appended claims.

According to a broad aspect of the invention, a speaker-phone system for communication between a near-end and a far-end is presented. The speaker-phone system includes an acoustic speaker at the near-end and a receiver for receiving a signal from the far-end for driving the acoustic speaker. A microphone converts an acoustic signal at the near-end to a signal to be transmitted (which may include a portion of the acoustic signal produced by the acoustic speaker), and a transmitter transmits the signal to be transmitted to the far-end. A circuit provides a modified frequency content to the received signal in a frequency range that may be contained in the signal to be transmitted.

The modified frequency content can be, for example, be accomplished by removal from the received signal of at least one frequency or range of frequencies that is contained in the signal to be transmitted. A detector is provided to detect the presence of the modified frequency content in the signal to be transmitted, which would indicate the existence of a near-end audio signal to be transmitted. A circuit is connected to modify at least one parameter of the speaker-phone system when the detector detects the presence of the modified frequency content in the signal to be transmitted.

The circuit for modifying a frequency content of the received signal can be, for instance a notch filter or the like, which filters a band of frequencies within an audio range of, for instance, between about 1000 Hz and 1500 Hz, with a center frequency of about 1400 Hz. The detector can be a notch filter or a power detector to detect power within the filtered frequency range.

According to still another broad aspect of the invention, a method for operating a speaker-phone system for communication between a near-end and a far-end is presented. The method can preferably be used in conjunction with a speaker-phone system of the type which has an acoustic speaker at the near-end and a receiver for receiving a received signal from the far-end for driving the acoustic speaker. The speaker-phone system also include a microphone for converting an acoustic signal at the near-end to a converted signal to be transmitted and a transmitter for transmitting the converted signal to the far-end. The method includes modifying a frequency content of the received signal within a frequency range that is contained in the converted signal, then detecting the presence of the modified frequency content in the converted signal. The method also includes modifying at least one parameter of the speaker-phone system when the modified frequency content is detected in the converted signal.

The step of modifying a frequency content of the received signal within a frequency range that is contained in the converted signal may include filtering the received signal to remove from the received signal at least one frequency or a band of frequencies that is contained in the converted signal. The step of modifying at least one parameter of the speaker-phone system when the modified frequency content is detected in the converted signal may include adjusting an attenuation of the received signal or adjusting parameters of line echo cancellation circuit and an acoustic echo cancellation circuit.

According to yet another broad aspect of the invention, an improved communication system is presented. The communication system includes a circuit for removing a frequency component from a received signal to output a modified received signal, and a speaker for converting the modified received signal to an acoustic signal. The circuit may be, for example, a notch filter, which may remove a sharp frequency range between about 1250 Hz and 1550 Hz. A microphone converts a second acoustic signal to an electrical signal for transmitting, and a detector produces a detector output if the removed frequency is present in the acoustic signal. A circuit is also provided to modify a circuit parameter applied to the received signal when the detector produces a detector output. The parameter may be, for instance an attenuation applied to the received signal.

According to yet another broad aspect of the invention, a method for processing communication signals is presented. The method includes removing a frequency component from a received signal to produce a modified received signal and converting the modified received signal to a first acoustic signal. The method also includes converting a second acoustic signal to an electrical signal for transmitting, the second acoustic signal possibly containing a portion of the first acoustic signal, and modifying circuit parameters applied to the received signal if the frequency component is present in the acoustic signal.

BRIEF DESCRIPTION OF THE DRAWINGS

The invention is illustrated in the accompanying drawings, in which.

In the various figures of the drawings, like reference numerals are used to denote like or similar parts.

DETAILED DESCRIPTION OF THE PREFERRED EMBODIMENTS

Figures 1, 2:
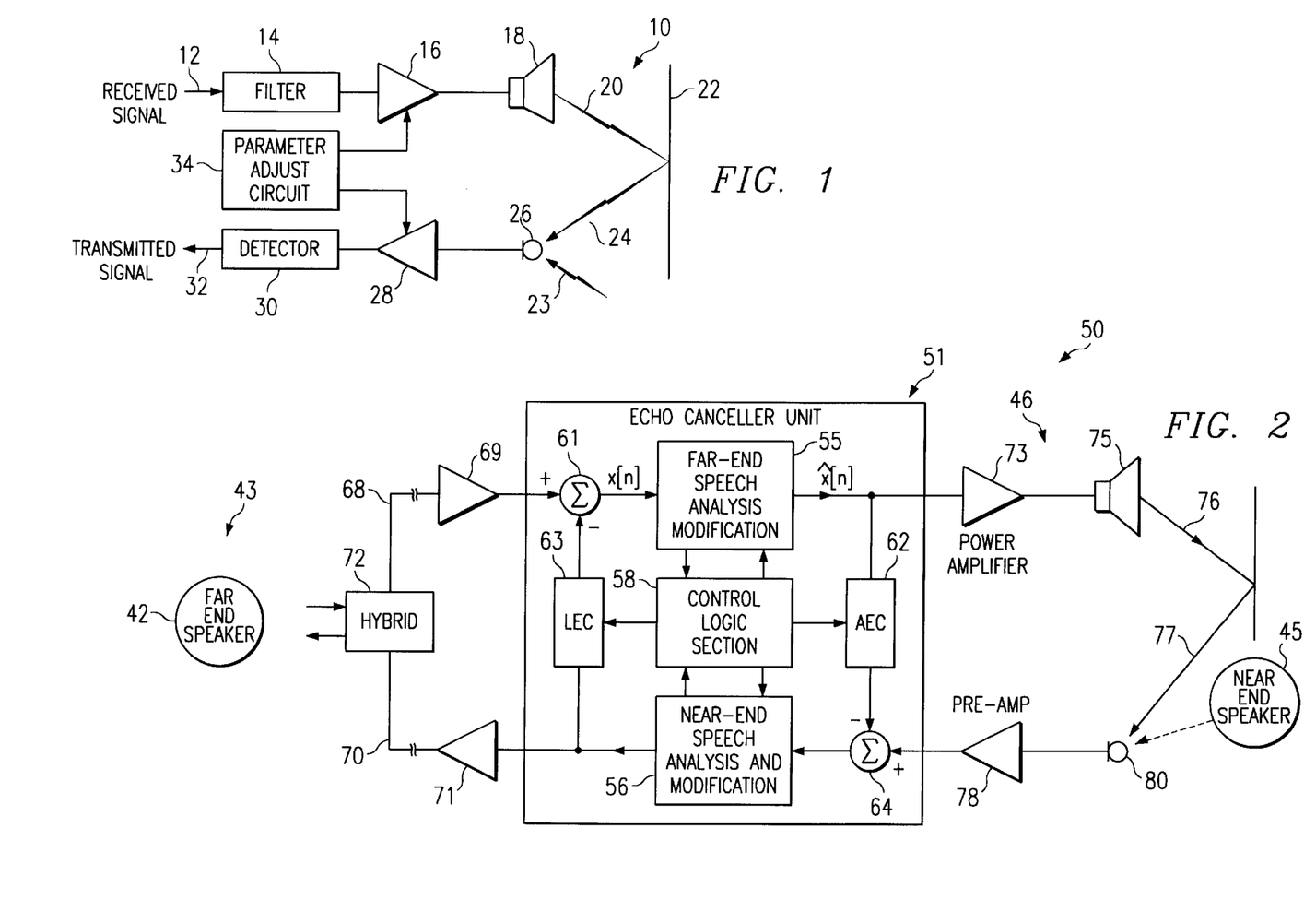
FIG. 1 is a block diagram showing the theory of operation of a system for detecting near-end speech in a communication system, in accordance with a preferred embodiment of the invention.
FIG. 2 is a block diagram of a system for detecting near-end speech that may be implemented with software, in accordance with a preferred embodiment of the invention.

A block diagram of a system 10 for detecting near-end speech in a communication system illustrating the theory of operation of a preferred embodiment of the invention is shown in FIG. 1. The system 10 can be used in a full, pseudo full, or half duplex speaker-phone or other communication system, which receives an incoming or received signal on line 12, which may be, for example, from a telephone wire, communication link, or other source. The received signal on line 12 is filtered by a filter circuit 14 to remove a frequency component from the received signal to output a modified received signal to an amplifier 16. The circuit 14 may be, for example, a notch filter, which may remove a sharp frequency range centered about, for example 1400 Hz, between about 1250 Hz and 1550 Hz. As will become apparent, the particular frequency that is removed is not critical, but preferably should be within a frequency range that is generated by an acoustic signal that will be transmitted as an outgoing communication signal, described next below. A speaker 18 receives the output from the amplifier 16, and converts the modified received signal to an acoustic signal 20.

The acoustic signal may traverse various paths, one of which may be directed to a microphone 26, which is intended to receive a local acoustic signal 23, for example, from a local individual or speaker (not shown), for outgoing transmission. The microphone 26 converts the local acoustic signal 23 and any portion of the reflected received acoustic signal 24 to an electrical signal for outgoing transmission, which is amplified by an amplifier 28, and applied to a detector 30.

The detector 30 detects the presence of a signal that is within the frequency range that was removed from the incoming signal by the filter 14, and operates to produces a detector output if the removed frequency is found to be present in the acoustic signal 24. The detector 30 may contain, for example, a band pass filter designed to pass signals at the frequency removed by the notch filter 14, such as, in the example described, between about 1250 Hz and 1550 Hz, at a center frequency of about 1400 Hz. Alternately, the detector 30 may include a power detector that detects the existence of signal power in the frequency ranges of interest. Although the detector 30 is shown in a series path between the amplifier 28 and the output line 32, it will be appreciated that its function is merely to detect the presence of the removed frequency; consequently, it can easily be realized by merely sampling the output signal from the amplifier 28.

A circuit 34 receives the output from the detector 30 to control one or more parameters of the circuit 10. For example, the circuit 34 may be used to adjust the gain or attenuation applied by the amplifier 16 to the input or received signal from line 12. In some embodiments, for example, in which half duplex operation is used, the circuit 34 may control a switch (not shown) to completely turn off the incoming received signal when near-end speech is detected to exist. Additionally, the amplifier may be connected, as shown, to the amplifier 28 to control the gain applied to the converted acoustic signal to be transmitted.

A block diagram of a speaker-phone system 50, employing software controlled circuitry for providing and detecting a frequency modification of the received signal, in accordance with another preferred embodiment of the invention, is shown in FIG. 2, to which reference is now made. The speaker-phone system 50 is used to communicate between a speaker 42 at a far-end 43 and a speaker 45 at a near-end 46, and includes a echo cancellation unit 51 to monitor the incoming and outgoing signals, as described below. It will be understood that although a single echo cancellation unit 51 is described with respect to the near-end 46 of the speaker-phone system 50, a similar echo cancellation unit (not shown) may be used in conjunction with the speaker-phone system at the far-end 53.

Since most speaker-phone systems are essentially telephonic, the far-end equipment is generally fortuitously configured in whatever manner in which it may be found, and may be beyond the control of a near-end user. Consequently, the duplication of the near-end system at the far-end, although preferable, is not at all necessary. It should also be noted that although the speaker-phone system 50 is described in conjunction with actual human speakers at the far-end 43 and near-end 46, the principles of the invention apply equally well to acoustic systems in general, for example, where one or the other users are non-human, such as a computer, a synthesized voice system, or the like, or in noise monitoring systems, such as so-called "baby monitors," or other such systems.

The echo cancellation unit 51 includes a far-end speech analysis and modification circuit 55 which receives a signal on the near-end receiving line 68, which is amplified by a receiver amplifier 69. The far-end 43 circuitry is represented by a box 72 labeled "hybrid," which can be constructed in a desired manner to output audio signals on line 68, and receive input audio signals on line 70 from the near-end 46. As mentioned, the hybrid circuit 72 may be constructed similarly to the echo canceler unit 51 at the near-end, but this is not a critical requirement. The output from the far-end speech analysis and modification circuit 55 is amplified by a power amplifier 73 at the near-end 46, and applied to an acoustic speaker 75.

A microphone 80 is provided to receive the acoustic signal, or voice, from the near-end speaker 45. The low level electrical output from the microphone 80 is amplified by a preamplifier 78 and conducted to a near-end speech analysis and modification circuit 56, the output of which is amplified by an output amplifier 71 for delivery to the far-end on line 70.

Typically, a certain amount of the acoustic signal 76 generated by the speaker 45 is directed or redirected into the microphone 80. This may be due, for example, to reflections from nearby walls or surfaces, or perhaps from a direct path of travel between the speaker 75 and microphone 80. To reduce the effects of such fed-back acoustic signal energy, an audio echo cancellation circuit 62 is provided. The echo cancellation circuit 62 receives a portion or sample of the output of from the far-end speech analysis and modification circuit 55, weights it, and subtracts it from the signal from the preamplifier 78 in a summer circuit 63, before the outgoing near-end signal is processed by the near-end speech analysis and modification circuit 56. Similarly, a line echo cancellation circuit 63 is provided that samples a portion of the output signal from the near-end speech analysis and modification circuit 56, weights it, and subtracts it from the incoming signal from amplifier 69 by a second summer circuit 61 before the incoming signal is applied to the far-end speech analysis and modification circuit 55.

The far-end speech analysis and modification circuit 55, the near-end speech analysis and modification circuit 56, the line echo cancellation circuit 63, and the acoustic echo cancellation circuit 62 are all controlled by a control logic section 58, which may conveniently be a digital signal processor, such as a TMS320C25, sold by Texas Instruments Incorporated, which may be programmed by a suitable digital computer program. (In fact all of the elements in block 51, including the echo cancellers 61 and 62, may be implemented by the digital signal processor.)

More particularly, the far-end speech analysis and modification circuit 55 can include a bank of digital notch filters, each individually tuned to a different frequency. The near-end speech analysis and modification circuit may be a bank of power measuring circuits, each for measuring the power at the same frequency bands corresponding to those provided by the notch filters of the far-end speech analysis and modification circuit 55. The power measuring circuits, moreover, can measure the power over both short and long term time windows. If the short term power exceeds the long term power at the frequencies of interest, then it follows that near-end speech must be present because the outgoing far-end speech did not contain any power in those frequency bands.

In addition, one or more of the digital notch filters that are provided within the far-end speech analysis and modification circuit 55 remove energy at a predetermined frequency, or set of frequencies. These removed frequencies are preferably in the range of frequencies that would be generated by whatever acoustic source that is generating the near-end acoustic signal. For example, if the near-end speaker is a human voice, the frequency band can be in the range of 1250 Hz to 1550 Hz, with a center frequency of about 1400 Hz. Of course any convenient frequency band or bands can be used, the choice of which not being critical.

The near-end speech analysis and modification circuit 56 also has, in addition to its normal power measuring circuits, one or more circuits to detect the presence of a frequency content in those frequency bands removed by the digital notch filters that are provided within the far-end speech analysis and modification circuit 55. This is done preferably by a power detector, although other detection techniques may be used. The control logic section 58 then determines that near-end speech exists if the energy in the power measuring circuits of the near-end speech analysis and modification circuit 56 in the frequency bands removed by the digital notch filters that are provided within the far-end speech analysis and modification circuit 55 exceeds a noise floor energy, as measured by the long term power levels. If near-end speech is determined to exist, any number of actions can be taken. For example, the attenuation of the received signal on line 68 can be attenuated, or turned off completely, and the outgoing signal from the preamplifier 78 further boosted. Or the relative gains and attenuations of the transmitted and received signals can be continuously adjusted to vary the loop gain of the circuit to maintain it at a constant level less than 0 dB. This may be particularly useful in full duplex systems. Alternatively, the parameters of the line and acoustic echo cancellation circuits 62 and 63 can be modified to increase or decrease the signal levels that are subtracted from the received and transmitted signals to provide maximum echo cancellation. Other appropriate parameter modifications will be apparent to those skilled in the art.

An example of a program (MATLAB M-file) that can remove frequency content from the far-end speech signal and test for the presence of the removed frequencies in the signal transmitted from the near-end is set forth below in TABLE 1. It is noted that in the code of TABLE 1, the far-end noise is simulated with random noise, and the near-end signal is simulated with an assumed power and signal to noise ratio, and with an assumption that the near-end speaker is silent during the first 1 second of the conversation.

TABLE 1

```
%   initialize the random number generator
    rand('seed', sum(clock)*100); randn('seed', sum(clock)*100);
%   far-end speech signal (w/additive wgn)
%   this signal stimulates the speaker on the far-end and the noise is added
%   to simulate a typical signal to noise ratio of a phone line (e.g. 40 db)
%   (The file 'c:\speech\dam_f.spd'^ is a 16-bit signed integer format
%   file that contains sample speech data)
    phonesnr=40;
    fid1=fopen('c:\speech\dam_f.spd'.'r');
    fes=fread(fid1, 'int16'); fes=fes(:)'; fes=fes/32768; sigpow=sum(fes.^2);
    sig_noise=randn(size(fes)); noisepow=sig_noise.^2);
    fes=fes+sqrt(sigpow/(10^(phonesnr/10)*noisepow))*sig_noise;
%   the following simulates the idea of removing frequency content from the
%   outgoing signal. In this simulation, a single notch filter is used; however,
%   other filters or combination of filters can be used for the same purpose.
%   example notch filter designed to remove frequency content in a neighborhood
%   around 1400 Hz.
    fs=8000; nfreq=1400; w0=2*pi*nfreq/fs;
    r=0.97; k2=1-r 2; k1=2*sqrt(1-k2/2)*sin(w0/2);
    b=((2-k2)/2)*[1    -2*(2-k2-k1^2)/(2-k2)    1];
    a=[1    -(2-k2-k1^2)    (1-k2)];
%   plot and print frequency response
    clg;
    [h,p]=freqz(b,a,512);
    H=dB(abs(h),100,0);
    v=[0:511]*4000/511;
    plot(v,H);
    ylabel('Magnitude Response (dB)');
    xlabel('Frequency (Hz)');
    title('Example Notch Filter Frequency Response');
    pause
%   frequency content modification of outgoing signal via notch filtering
    fes_mod=filter(b,a,fes);
%   acoustic echo path
%   the following represents a typical acoustic echo path as described
%   in the literature (e.g. Perez, et al.; 'Acoustic . . .'IEICE Trans. Vol. 24 1991)
```

TABLE 1-continued

```
%   Note: there is no loss of generality in using this particular echo path.
    M=32;                    % time duration of echo path (in 8 KHz samples)
    pathgain=-6;             % acoustic echo path gain
    hcl=(rand(1,M)-0.5).*(10. (-6*[0:M-1]/M));
    hcl=hcl*sqrt(10^(pathgain/10)/sum(hcl.^2)); hcl=hcl(:)';
%   create returned signal which is composite of:
%   1) far-end speech returned signal
%   2) near-end speaker, and
%   3) environmental noise
    N=3*8000;                % number of samples used in simulation
%   far-end speech returned signal
%   signal is assumed to be a convolution of echo path and far-end signal
    fes_ret=conv(hcl,fes_mod(M+1:N));
%   near-end speaker
%   this signal represents the near-end speaker who would be located in the
%   room (acoustic chamber) and speaking into the microphone.
%   (The file 'c:\speech\dam_m.spd'^ is a 16-bit signed integer format
%   file that contains sample speech data)
    fid2=fopen('c:\speech\dam_m.spd','r')
    nes=fread(fid2, 'int16'); nes=nes(:) nes=nes/32768;
    nes=nes(1:max(size(fes_ret)));
%   set the first 8000 samples to zero to simulate that the near-end speaker
%   is silent during the first 1.0 seconds of the conversation
    nes(1:8000)=zeros(1,8000);
    sp_ret=fes_ret+nes;
%   add wgn to achieve a given snr
    invsnr=15;
    sigpow=sum(sp_ret.^2);
    sig_noise=randn(size(sp_ret)); noisepow=sum(sig_noise.^2);
    sp_ret=sp_ret+sqrt(sigpow/(10^(envsnr/10)*noisepow))*sig_noise;
%   near-end speech detector
%   shortterm (12 ms) power window constants
    shortwin=12*10^(-3)/(125*10^(-6)); sbeta=2^(-15/shortwin);
    longwin=100*10^(-3)/(125*10^(-6)); lbeta=2^(-15/longwin);
%   filter returned signal to isolate frequency bands of interest and compute
%   the short-term power sequence associated with those bands to simulate the
%   section of the detector that analyzed frequency bands of interest and
%   computes long and short term power estimates
%   detection filter specifications
    fs=8000; nfreq=1400; w0=2*pi*nfreq/fs;
    r=0.99; k2=1-r^2; k1=2*sqrt(1-k2/2)*sin(w0/2);
    b=(-k2/2)*[1   0   -1];
    a=[1   -(2-k2-k1^2)   (1-k2)];
%plot and print frequency response
    [h,p]=freqz(b,a,512);
    H=dB(abs(h),100,0);
    v=[0:511]*4000/511;.
    plot(v,H);
    ylabel('Magnitude Response (dB)');
    xlabel('Frequency (Hz)');
    title('Example Detection Filter Frequency Response');
    pause
%   filter signal
    temp=filter(b,a,sp_ret);
    short_pow=filter((1-sbeta),[1-sbeta],temp.^2);
    long_pow=filter((1-lbeta),[1-lbeta],temp.^2);
%   calculate ambient noise floor as the short term power that we
%   measure during the initialization period
    nesp=short_pow>=2.5*max(long_pow(1:4000));
%   plot signals
    clg;
    subplot(211), plot(nes);
    title('Near-End Speech Signal')
    subplot(212), plot(nesp);
    title('Near-End Speech Detector output')
    print
```

Figure 3:
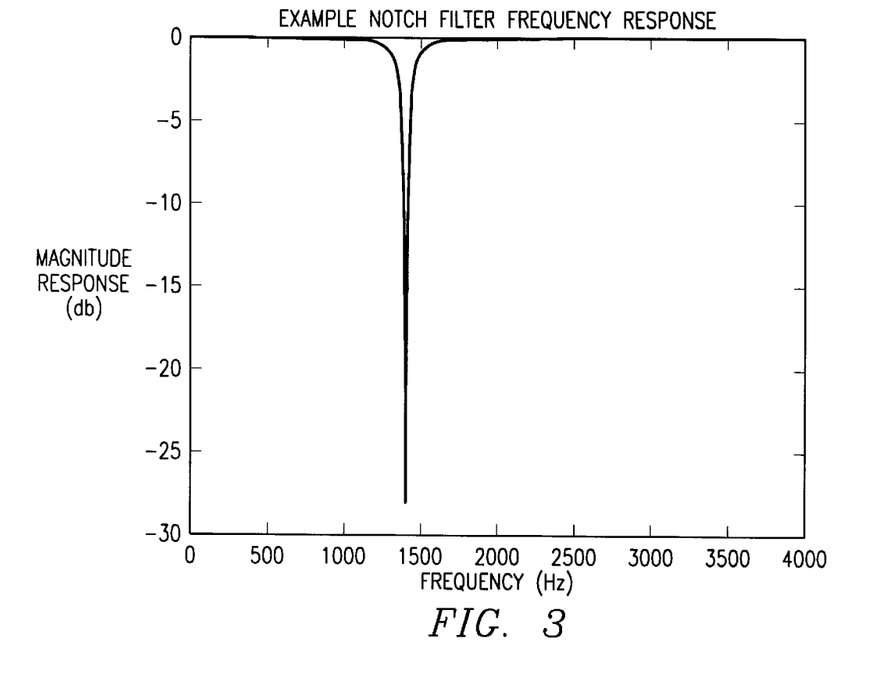
FIG. 3 is a graph of attenuation vs frequency of a typical filter that may be used to filter a received far-end signal, in accordance with a preferred embodiment of the invention, and which is generated by the computer program of TABLE 1.

The attenuation of the received far-end signal produced by the filter of the program of TABLE 1 is shown in FIG. 3. Design techniques to realize a software or hardware version of a filter having similar notch characteristics as those described are well known, and can be readily accomplished by those skilled in the art. It can be seen that the filter produced is a notch filter, having a center frequency at about 1400 Hz. The filter characteristics are fairly sharp, attenuating a frequency range between about 1250 Hz and 1550 Hz. This particular frequency range is one that would most likely be contained in a near-end speech signal, but since the 300 Hz bandwith is relatively narrow, its attenuation or removal from the received far-end signal would not significantly reduce the overall quality of the received far-end signal.

Figure 4:
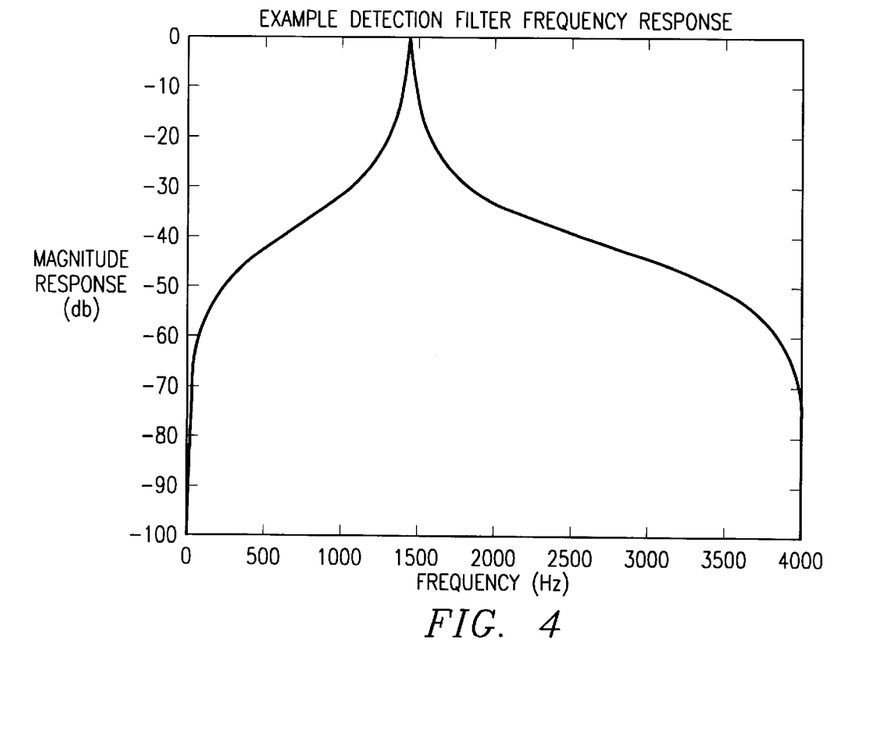
FIG. 4 is a graph of attenuation vs frequency of a typical detector that may be used to detect a transmitted near-end signal, in accordance with a preferred embodiment of the invention, and which is generated by the computer program of TABLE 1.

The frequency response of the frequency detector is shown in FIG. 4, and has a similarly sharp frequency detection response centered about 1400 Hz. It can be seen that the detector has a relatively sharp response, falling off about 25 db at about ±150 Hz from the center frequency.

A typical near-end speech signal is shown in FIG. 4, which might be generated by a speaker at the near-end. The near-end speech signal in the computer code generated above in TABLE 1 is separately inserted from a disk file, but contains a frequency component at about 1400 Hz.

Figure 5:
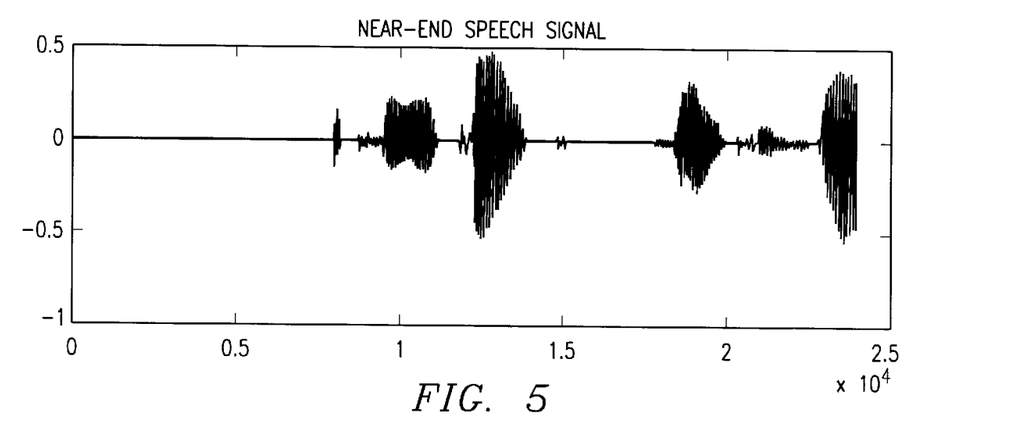
FIG. 5 is a graph of amplitude vs time for a typical near-end speech pattern.
Figure 6:
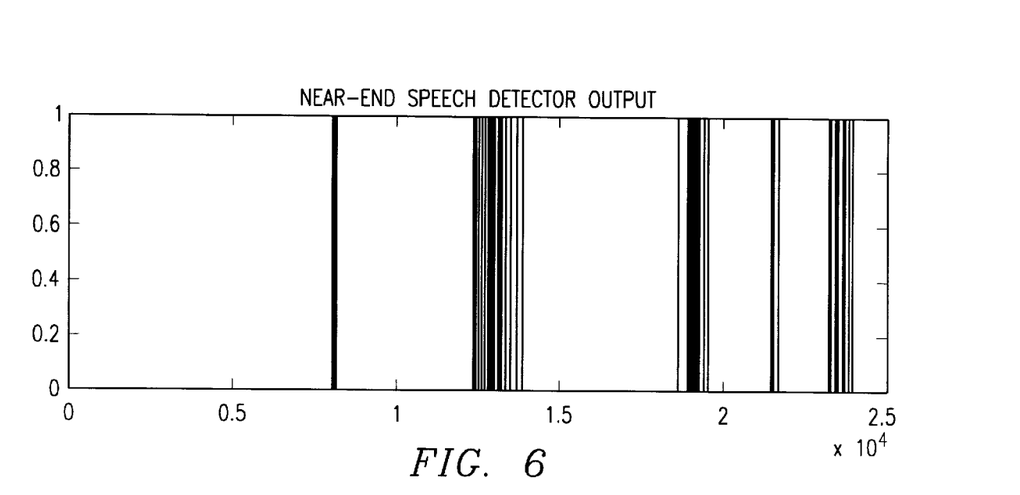
FIG. 6 is a graph of the magnitude of a detector output vs time for the speech pattern of FIG. 4, generated by the computer program of TABLE 1, in accordance with a preferred embodiment of the invention.

The output from the detector simulated by the code of TABLE 1 in response to the near-end speech signal of FIG. 4 is shown in FIG. 5. It can be seen that the constant amplitude outputs generated correspond to the discrete segments of the speech signal.

The computer program of TABLE 1 is primarily intended to demonstrate the theory of operation of the invention. The outputs are provided in the form of printed plots or graphs of the detector for detecting the presence of frequencies that are expected to be contained in the near-end speech. However, one skilled in the art would find connection of the output from the detector to control parameters of the communication circuit embodying the invention readily apparent.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A speaker-phone system for communication between a near-end terminal and a far-end terminal, comprising:

an acoustic speaker at the near-end terminal;

a receiver for receiving a first signal from the far-end terminal for driving the acoustic speaker;

a microphone for converting an acoustic signal at the near-end terminal to a second signal to be transmitted, the microphone being acoustically coupled to the acoustic speaker at the near-end terminal;

a transmitter for transmitting said second signal to be transmitted to the far-end terminal;

a first circuit for providing a fixed frequency content to said first, received signal in a frequency range that may be contained in said signal to be transmitted, the first circuit including a filter for removing from the first, received signal at least one frequency that is contained in the signal received from the far-end terminal to provide the fixed frequency content;

a detector to detect the presence of a modification of said known frequency content in said second signal to be transmitted, the detector including a power detector for detecting signal power at the at least one frequency removed from the first, received signal; and a control circuit connected to the first circuit and the detector to modify at least one parameter of the speaker-phone system when said detector detects a long term power level greater than a noise floor in the second signal to be transmitted at the at least one frequency removed from the first, received signal.

2. The speaker-phone system of claim 1 wherein said first circuit for providing a fixed frequency content to said first received signal comprises a filter for removing from the first, received signal at least one frequency that is contained in said second signal to be transmitted.

3. The speaker-phone system of claim 2 wherein said filter is a notch filter.

4. The speaker-phone system of claim 3 wherein said detector is a notch filter.

5. The speaker-phone system of claim 3 wherein said notch filter filters frequencies between about 1250 Hz and 1550 Hz.

6. The speaker-phone system of claim 4 wherein said filter has a center frequency of about 1400 Hz.

7. The speaker-phone system of claim 1 wherein said control circuit comprises a circuit to adjust an attenuation of the first signal.

8. The speaker-phone system of claim 1 wherein said control circuit comprises a circuit to adjust parameters of a line echo cancellation circuit and an acoustic echo cancellation circuit.

9. The speaker-phone system of claim 1 wherein the first circuit for providing a known frequency content uses frequency domain operations.

10. The speaker-phone system of claim 1 wherein the first circuit for providing a known frequency content provides a steady-state response.

11. The speaker-phone system of claim 10 wherein the response is a steady-state frequency response.

12. A speaker-phone system for communication between a near-end terminal and a far-end terminal, comprising:

an acoustic speaker at the near-end terminal;

a receiver for receiving a first signal from the far-end terminal for driving the acoustic speaker;

a microphone for converting an acoustic signal at the near-end terminal to a second signal to be transmitted, the microphone being acoustically coupled to the acoustic speaker at the near-end terminal;

a transmitter for transmitting said second signal to be transmitted to the far-end terminal;

a filter for removing from the first, received signal at least one frequency that is contained in said second signal to be transmitted;

a detector to detect the presence of said at least one frequency in said second signal to be transmitted; and a control circuit connected to modify at least one parameter of the speaker-phone system when said detector detects the presence of said at least one frequency in said second signal to be transmitted.

13. The speaker-phone system of claim 12 wherein said filter is a notch filter.

14. The speaker-phone system of claim 13 wherein said detector is a notch filter.

15. The speaker-phone system of claim 14 wherein said notch filter filters frequencies between about 1250 Hz and 1550 Hz.

16. The speaker-phone system of claim 14 wherein said filter has a center frequency of about 1400 Hz.

17. The speaker-phone system of claim 12 wherein said detector comprises a band pass filter.

18. The speaker-phone system of claim 12 wherein said detector comprises a power detector for detecting signal power at a frequency of said filter.

19. The speaker-phone system of claim 12 wherein said control circuit comprises a circuit to adjust an attenuation of the signal from the far-end.

20. The speaker-phone system of claim 12 wherein said control circuit comprises a circuit to adjust parameters of a line echo cancellation circuit and an acoustic echo cancellation circuit.

21. The speaker-phone system of claim 12 further comprising:

a second acoustic speaker at the far-end terminal;

a second receiver for receiving the second signal from the near-end terminal for driving the second acoustic speaker at the far-end terminal;

a second microphone for converting an acoustic signal at the far-end terminal to the first signal to be transmitted to the near-end terminal;

a second transmitter for transmitting said first signal at the far-end terminal to the near-end terminal;

a second filter for removing from the second signal received from the near-end terminal at least one frequency that is contained in said first signal to be transmitted;

a second detector to detect the presence of said at least one frequency in said first signal to be transmitted;

and a control connected to modify at least one parameter of the speaker-phone system at said far-end terminal when said second detector detects the presence of said at least one frequency in said first signal to be transmitted from said far-end terminal.

22. A method for operating a speaker-phone system for communication between a near-end terminal and a far-end terminal, said speaker-phone system having an acoustic speaker at the near-end terminal, a receiver for receiving a first, received signal from the far-end terminal for driving the acoustic speaker, a microphone for converting an acoustic signal at the near-end to a converted signal to be transmitted, the microphone being acoustically coupled to the speaker at the near-end terminal, and a transmitter for transmitting said converted signal to the far-end terminal, comprising:

removing a known content from said first, received signal within a frequency range that is contained in said converted signal;

detecting the presence of a change to said known content in said converted signal;

and modifying at least one parameter of the speaker-phone system when said change to said known content is detected in said converted signal.

23. The method of claim 22 wherein said step of removing comprises filtering said first, received signal to remove from the received signal at least one frequency that is contained in said converted signal.

24. The method of claim 22 wherein said step of removing comprises filtering a band of frequencies from said received signal to remove from the received signal a band of frequencies that is contained in said converted signal.

25. The method of claim 24 wherein said step of modifying comprises adjusting an attenuation of the received signal.

26. The method of claim 24 wherein said step of modifying comprises adjusting parameters of a line echo cancellation circuit and an acoustic echo cancellation circuit.

27. The method of claim 22 wherein said step of removing comprises filtering a band of frequencies between about 1250 Hz and 1550 Hz from said received signal.

28. The method of claim 22 wherein said step of removing comprises filtering a band of frequencies from said received signal that has a center filtered frequency of about 1400 Hz.

29. A communication system, comprising:

a circuit for removing a frequency component from a received signal to output a modified received signal;

a speaker for converting the modified received signal to an acoustic signal;

a microphone, acoustically coupled to the speaker, for converting an acoustic signal to an electrical signal for transmitting;

a detector for producing a detector output if said removed frequency is present in said acoustic signal; and a circuit for modifying a circuit parameter applied to said received signal when said detector produces a detector output.

30. The communication system of claim 29 wherein said circuit for removing a frequency component is a notch filter.

31. The communication system of claim 30 wherein said notch filter has a sharp pass band between about 1250 Hz and 1550 Hz.

32. The communication system of claim 30 wherein said notch filter has a center frequency of about 1400 Hz.

33. The communication system of claim 30 wherein said detector has a sharp detection frequency band approximately corresponding to the pass band of said notch filter.

34. The communication system of claim 29 wherein said circuit for modifying a circuit parameter comprises a circuit to modify an attenuation applied to said received signal.

35. A method for processing communication signals, comprising:

removing a frequency component from a received signal to produce a modified received signal;

converting the modified received signal to a first acoustic signal;

converting a second acoustic signal to an electrical signal for transmitting, said second acoustic signal containing said first acoustic signal;

and modifying circuit parameters applied to said received signal if said frequency component is present in said acoustic signal.

36. The method of claim 35 wherein said step of removing a frequency component from a received signal comprises filtering a frequency band.

37. The method of claim 36 wherein said step of filtering a frequency band comprises filtering a frequency band that is expected to be contained in said acoustic signal.

38. The method of claim 35 wherein said step of modifying circuit parameters applied to said received signal comprises detecting whether said frequency component exists in said acoustic signal.

* * * * *